US011982124B2

(12) United States Patent
Machado Rainha

(10) Patent No.: US 11,982,124 B2
(45) Date of Patent: May 14, 2024

(54) FRAMEWORK WITH IN-BUILT ANTI-POLLEN/MOSQUITO NET

(71) Applicant: BBG, S.A., Esposende (PT)

(72) Inventor: Hugo Miguel Machado Rainha, Maia (PT)

(73) Assignee: BBG, S.A., Esposende (PT)

( * ) Notice: Subject to any disclaimer, the term of this patent is extended or adjusted under 35 U.S.C. 154(b) by 710 days.

(21) Appl. No.: 16/972,634

(22) PCT Filed: Jun. 7, 2018

(86) PCT No.: PCT/PT2018/050024
§ 371 (c)(1),
(2) Date: Dec. 7, 2020

(87) PCT Pub. No.: WO2019/235947
PCT Pub. Date: Dec. 12, 2019

(65) Prior Publication Data

US 2021/0246722 A1 Aug. 12, 2021

(51) Int. Cl.

| | |
|---|---|
| ***E06B 9/54*** | (2006.01) |
| ***E05F 15/643*** | (2015.01) |
| *E05B 63/00* | (2006.01) |
| *E05B 65/08* | (2006.01) |
| *E05C 7/00* | (2006.01) |

(52) U.S. Cl.
CPC .............. *E06B 9/54* (2013.01); *E05F 15/643* (2015.01); *E05B 63/0056* (2013.01); *E05B 65/087* (2013.01); *E05C 2007/007* (2013.01); *E05Y 2900/132* (2013.01); *E05Y 2900/148* (2013.01); *E06B 2009/543* (2013.01)

(58) Field of Classification Search
CPC ................. E06B 2009/543; E06B 9/54; E06B 2009/528; E06B 2009/546; E06B 2009/527; E06B 3/4636; E06B 3/42; E06B 3/46; E05F 15/643; E05B 65/0829; E05B 65/0811
See application file for complete search history.

(56) References Cited

U.S. PATENT DOCUMENTS 4,738,052 A * 4/1988 Yoshida .................... E05F 1/16 49/31
4,893,435 A * 1/1990 Shalit .................... E05F 15/643 49/449
4,993,468 A 2/1991 Hackman et al.
(Continued)

*Primary Examiner* — Abe Massad
(74) *Attorney, Agent, or Firm* — Rivka Friedman

(57) ABSTRACT

The present invention consists of aluminium framework for the manufacture of doors or windows, which is applied in a door or window opening of a building. It comprises at least one fixed frame (1) and fixed or movable panels (4) which have central (6) and reinforcing (5) props, handles (3) (7), anti-pollen/mosquito net (9) winder integrated into a profile (10). It has a locking system (2) of the panels (4), which is integrated in the aluminium profiles of the fixed frame (1); a locking system (8) of the anti-pollen/mosquito net (9) allowing the profile (11) of the net (9) to be attached to the handle (7). The movements of the net (9) and the panels (4) can be performed either manually or automatically, in both cases this movement being facilitated by a slide rule (13) with integrated bearings.

14 Claims, 10 Drawing Sheets

(56) References Cited

U.S. PATENT DOCUMENTS

| | | | | |
|---|---|---|---|---|
| 5,884,361 | A * | 3/1999 | Richardson | E05F 1/16<br>16/102 |
| 9,605,474 | B1 * | 3/2017 | McCauley | E06B 9/40 |
| 9,932,769 | B2 * | 4/2018 | Woolery | E06B 9/54 |
| 11,053,725 | B2 * | 7/2021 | Romero | E05F 15/643 |
| 2007/0227676 | A1 * | 10/2007 | Legay | E06B 7/03<br>160/102 |
| 2012/0031001 | A1 | 2/2012 | Dorr et al. | |
| 2015/0233172 | A1 | 8/2015 | Haberland | |
| 2019/0071894 | A1 * | 3/2019 | Geringer | E05B 47/023 |
| 2019/0194991 | A1 * | 6/2019 | Fontijn | E06B 3/46 |

* cited by examiner

FRAMEWORK WITH IN-BUILT ANTI-POLLEN/MOSQUITO NET

FIELD OF THE INVENTION

This invention relates to a framework with in-built anti-pollen and/or mosquito net, which is within the field of mechanical engineering applied to civil engineering, more particularly of fixed construction elements. Also, the invention falls within the scope of the International Patent Classification in E06B7/22,14; E05F7/08; E06B5/11; E06B3/00, 96,30,46; E05C9/20; E05D15/06.

BACKGROUND OF THE INVENTION

The closest prior art of this invention can be found in the patent document GR 20070100627 A, hereinafter referred to as D1, which discloses a system of sliding aluminium sashes provided with an anti-mosquito grid mechanism hidden inside the profile of the sliding guide or panel. This invention differs from the one disclosed on said document, since in the case of the present invention the mosquito net roller is integrated into the fixed frame, whereas in D1 it is aggregated to the handle (or movable panel), i.e. whenever the window is opened the roller moves along with the handle, which is the opposite of this invention. Also the actuation mechanism is a different one, since the locking system of this invention, regarding both the handle and the mosquito net, is multipoint and carried out in the fixed frame, and not directly in the handle.

Therefore, this invention has the following advantages comparatively to the aforementioned state of the art:

- maximum allowable dimensions to be manufactured per sash;
- anti-pollen/mosquito net, concealed into the system;
- manual or automatic actuation also of the anti-pollen/mosquito net;
- anti-pollen/mosquito net dimensions (openings up to 2000 mm wide and 5000 mm height);
- the maximum permissible weight of each movable/fixed panel (4);
- possibility of movement of the panels (4) in perpendicular planes;
- there are no visible types of fasteners of the fixed frame (1), such as bolts, female screws, rivets or others;
- the profiles of the central (6) and/or reinforcing (5) plumbs with 18 mm of visible thickness;
- the closing points (3*c*) of the locking system (2) of the movable panels (4) are floating and can be adjusted in depth in order to always enable a good fit between the closing points and the striking plates (7*a*) of the handle 3);
- the closing points (6*c*) of the anti-pollen/mosquito net (9) are floating and can be adjusted in depth in order to always enable a good fit between the closing points (6*c*) and the striking plates (9*a*) of the net's (9) handle (7);
- for the panels (4) to be susceptible of being moved with a minimum effort, an aluminium profile was specially designed for this system where stainless steel bearings are installed. This profile is called a slide rule (13) and it is housed in the lower portion of the fixed frame (1) in specially designed grooves securing the slide rules (13);
- the number of bearings used in each slide rule (13) depends on the weight and width of the panels (4).

SUMMARY OF THE INVENTION

The present invention relates to an aluminium framework for the manufacture of doors or windows, which is applied in a door or window opening of a building, comprising an anti-pollen and/or mosquito net (9) integrated in the fixed frame (1), which is inserted into a winder and which is automatically wound or unwound by means of torsion springs inserted in the winder of the mosquito net (9), which promotes the rolling movement of the mosquito net separately.

On its turn, this net (9), by means of a locking system (8), can be attached to a handle (7) whenever the movable panel (4) is moved in the opening direction and simultaneously to the opening of the panels (4), thereby allowing to fully prevent the entrance of insects and/or pollen into the interior of the building when the movable panels (4) are open, and simultaneously allowing the circulation of air within the same.

In addition to this effect, this innovation makes it possible to automate the anti-pollen/mosquito net, without the need to attach more profiles to the fixed frame (1).

This invention presents at the same time the advantage of having the functionality of the movement of both the net (9) and the panels (4) being either manual or, alternatively, automatic by remotely actuating the locking systems (2) and (8), by means of an electronic mechanism together with solenoids (17*a*) (17*b*) and the automatic sliding thereof including the incorporation, also in the fixed frame (1), of a traction car (16), motor support (14) and free pulley (15).

It shall be stated that the locking systems (2) (8) can work together or separately, i.e., the following functions are possible:

1. locking of the panel (4) by the locking system (2) after sliding for closing, this sliding being either manual or automatic;
2. unlocking of the panel (4) by the locking system (2) by manually pressing a handle or automatically by remote actuation of the solenoid (17*a*) either followed or not by sliding of the panel (4);
3. Unlocking of the panel (4) by the locking system (2) and locking of the net (9) by the locking system (8), with the sliding of the panel (4) in this functionality being accompanied by the unwinding and sliding of the net (9).

DESCRIPTION OF FIGURES

Indication of Reference Numbers

- fixed frame (1);
- locking system (2) of the panels (4);
- rod (2*a*) integrated into the fixed frame (1);
- handle (3);
- adjusting screws (3*a*) of the rod (2*a*);
- compensating spring (3*b*) of the rod (2*a*);
- closing points (3*c*) of the rod (2*a*);
- movable/fixed panels (4);
- reinforcing central plumb (5);
- central plumb (6);
- locking system (8) of the panel (4);
- rod (8*a*) inserted into the panel profile (11) of the net (9);
- adjusting screws (6*a*) of the rod (8*a*);
- compensating spring (6*b*) of the rod (8*a*);
- closing points (6*c*) of the rod (8*a*);
- handle (7) of the net (9);
- net (9);
- housing profile (10) of the net (9);
- panel profile (11) of the mosquito net (9) wherein the rod (8*a*) is inserted;
- brass bar (12) attached to the lower section of the panel (4);

Figure 1:
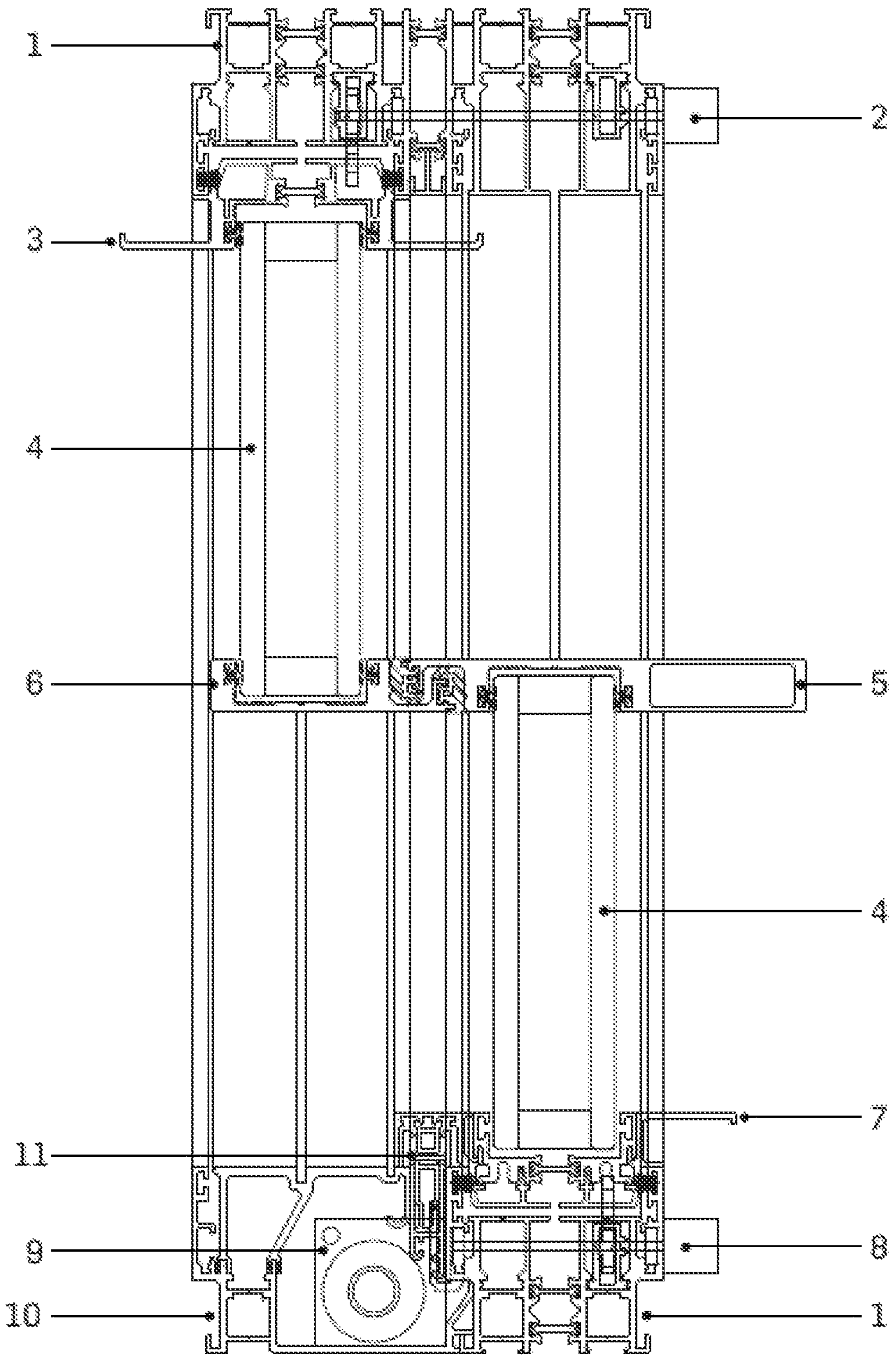

slide rule (13);
motor support (14);
free pulley (15);
traction car (16);
toothed belt (17);
solenoid (17*a*);
closing rod (18) of the moveable panel (4);
closing rod (19) of the mosquito net (9).

FIG. 1—Graphical representation of a horizontal section of the sash where one intends to depict the different constituents of the system. The illustrated sash is a sliding door with two movable panels (4).

Figure 2:
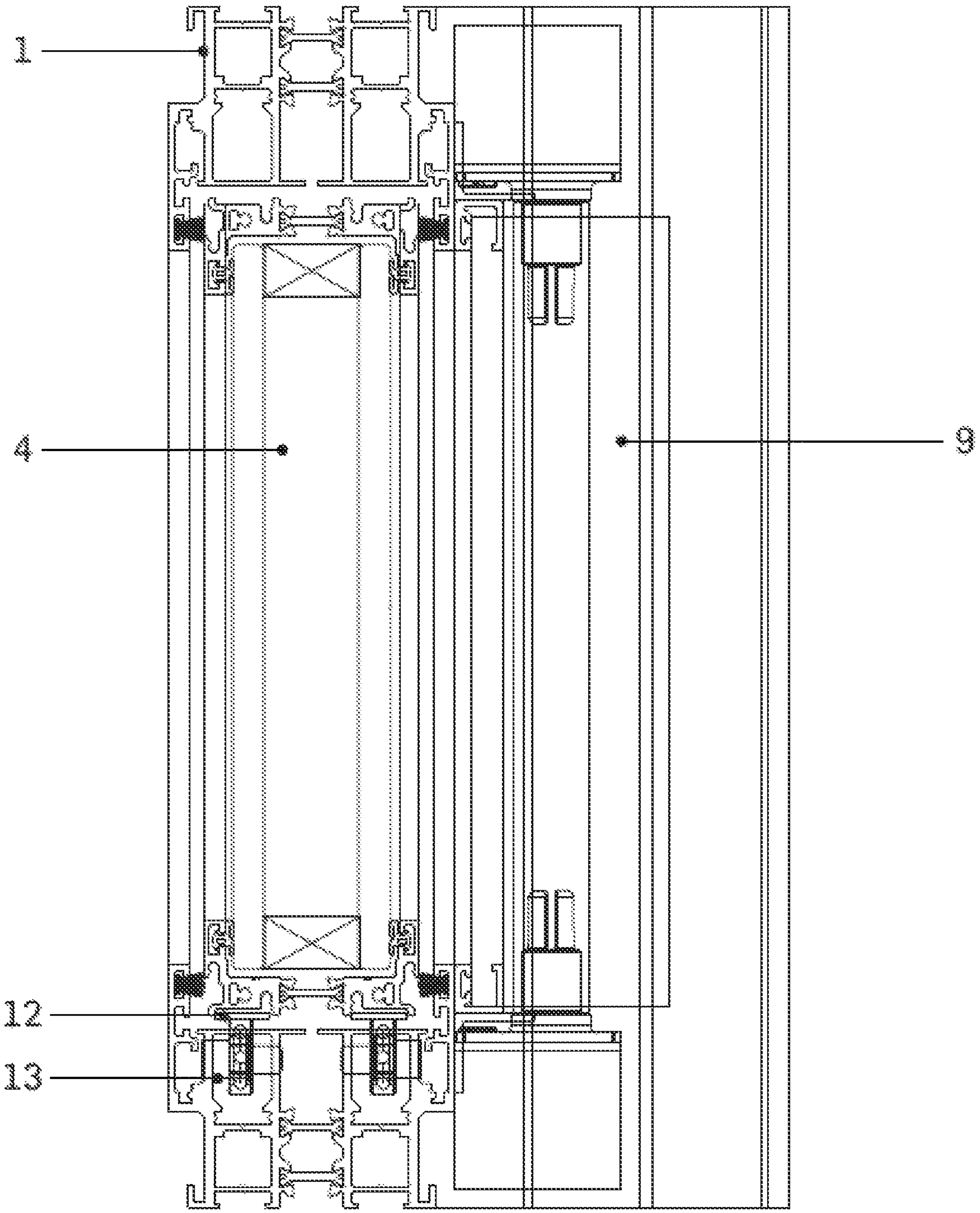

FIG. 2—Graphical representation of a vertical section of the same sash.

Figure 3:
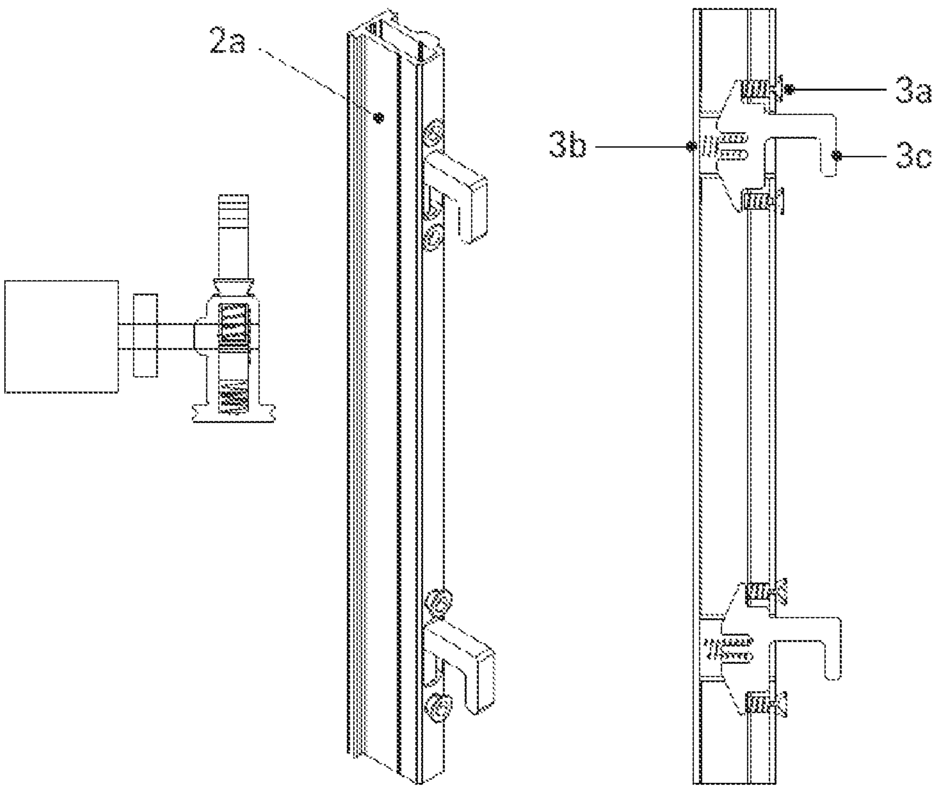

FIG. 3—Graphical representation of the locking system (2) of the panels (4), where the rod (2*a*) is illustrated with the closing points (3*c*), adjusting screws (3*a*) and the compensating spring (3*b*). This figure shows a locking system with two closing points (3*c*).

Figure 4:
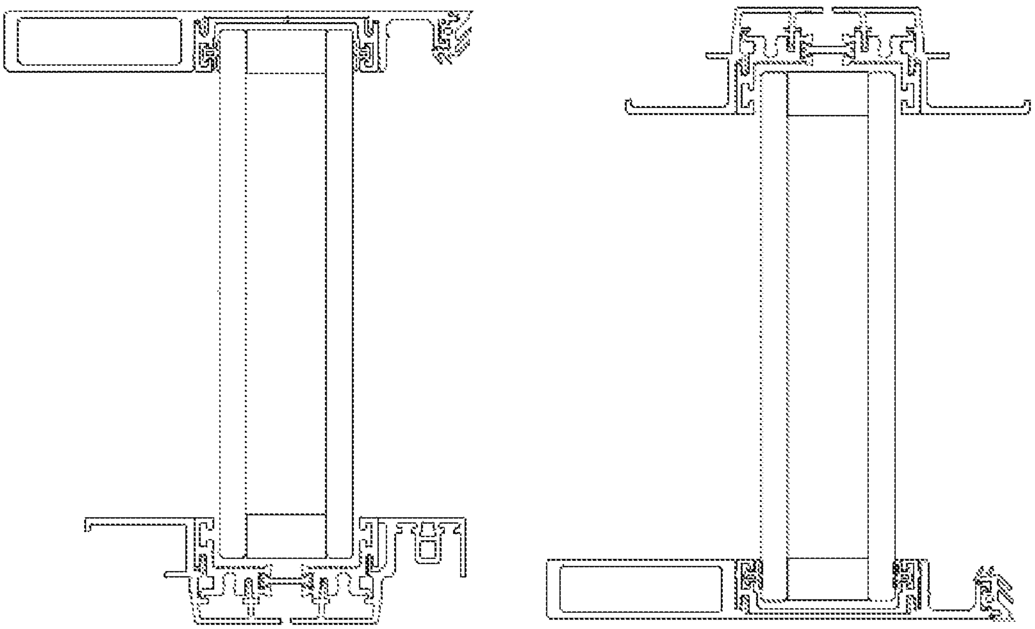

FIG. 4—Graphical representation of the movable/fixed panels (4).

Figure 5:
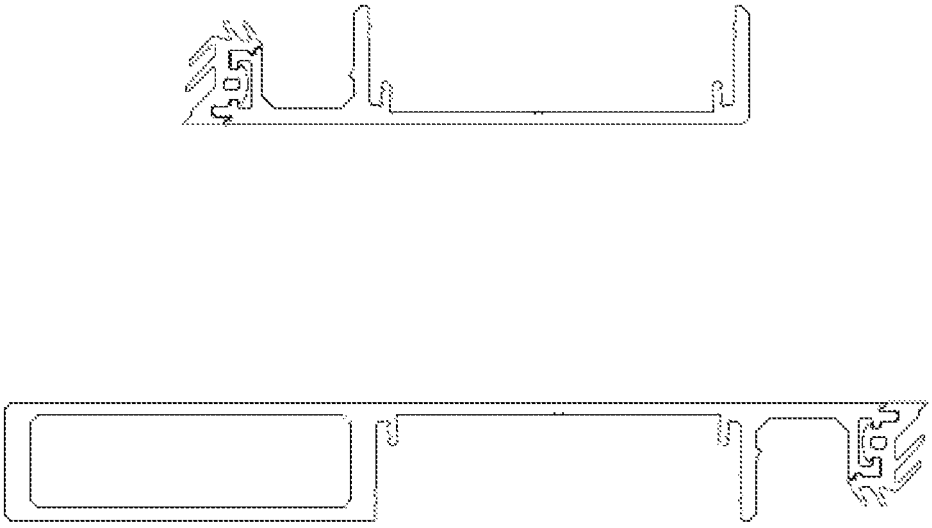

FIG. 5—Graphical representation of the central (6) and reinforcing central (5) plumbs.

Figure 6:
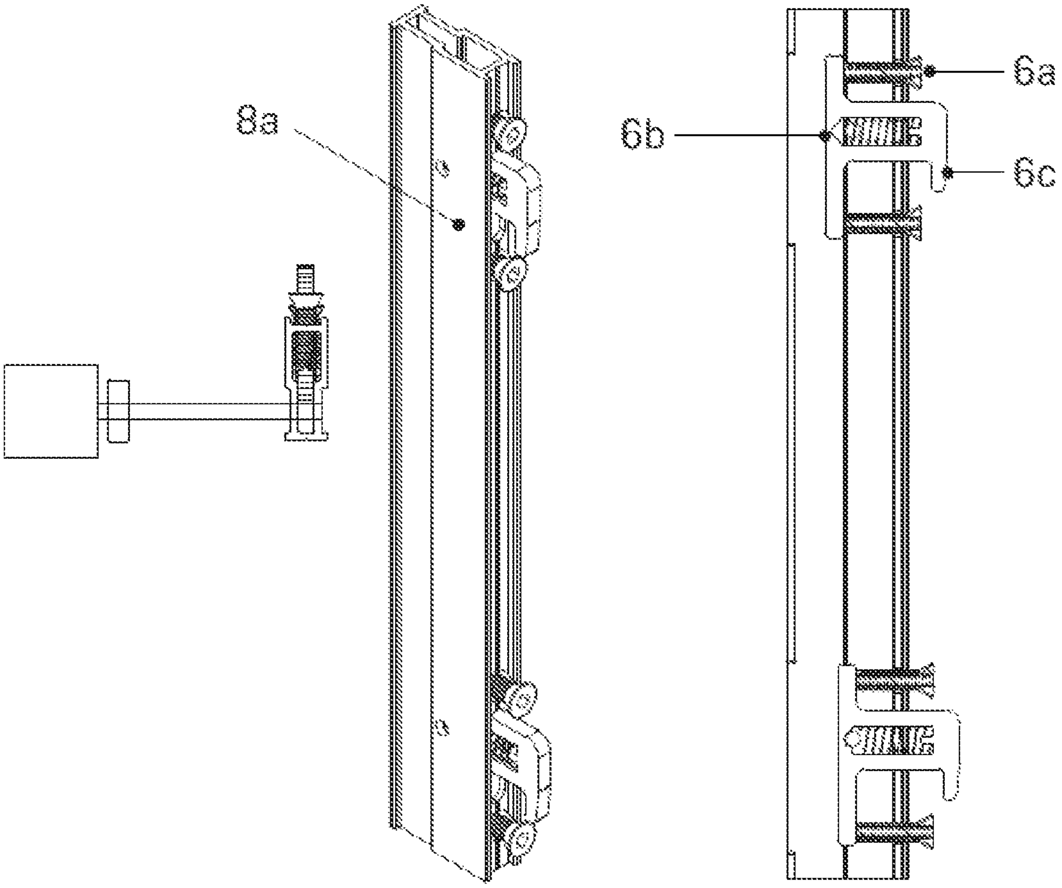

FIG. 6—Graphical representation of the actuation system (8), where the rod (8*a*) is illustrated with the closing points (6*c*), adjusting screws (6*a*) and the compensating spring (6*b*). This figure shows a locking system with two closing points (6*c*).

Figure 7:
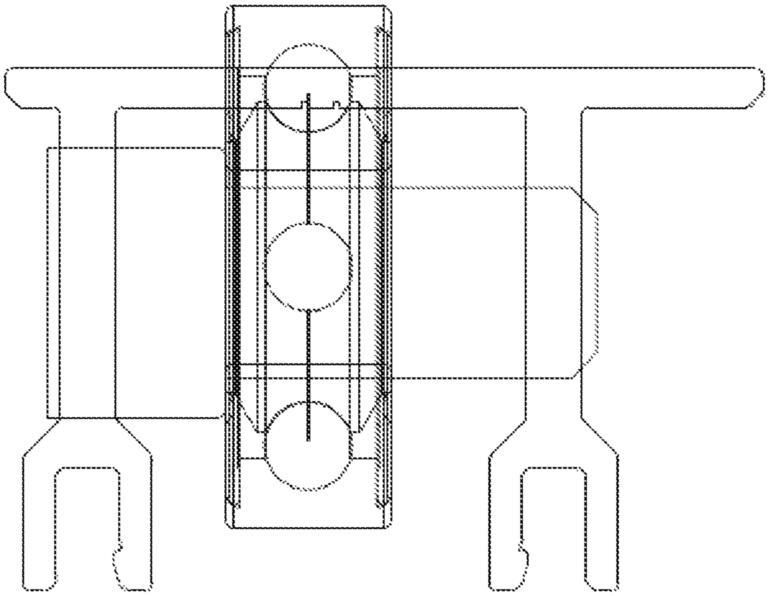

FIG. 7—Graphical representation of the slide rules (13).

Figure 8:
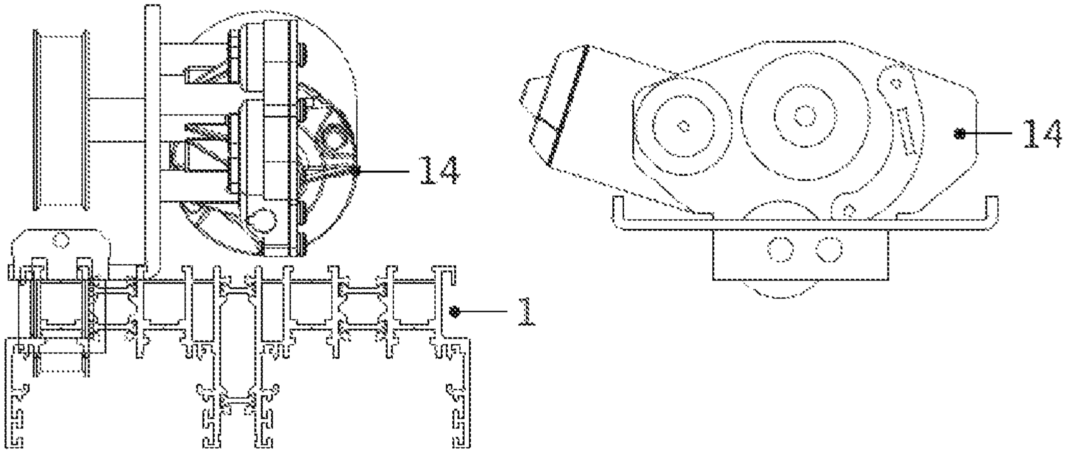

FIG. 8—Detail of the motorized system which is integrated in the fixed frame (1), wherein the motor support (14) is illustrated.

Figure 9:
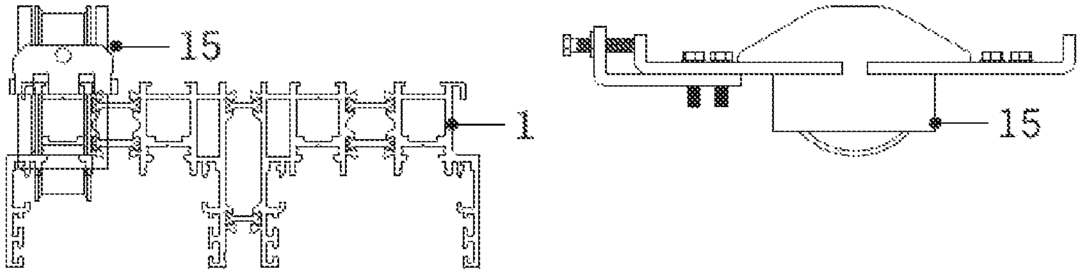

FIG. 9—Detail of the motorized system which is integrated in the fixed frame (1), wherein the free pulley (15) is illustrated.

Figure 10:
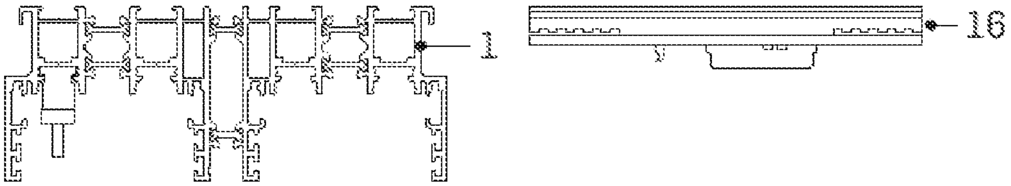

FIG. 10—Detail of the motorized system which is integrated in the fixed frame (1), wherein the traction car (16) is illustrated.

Figure 11:
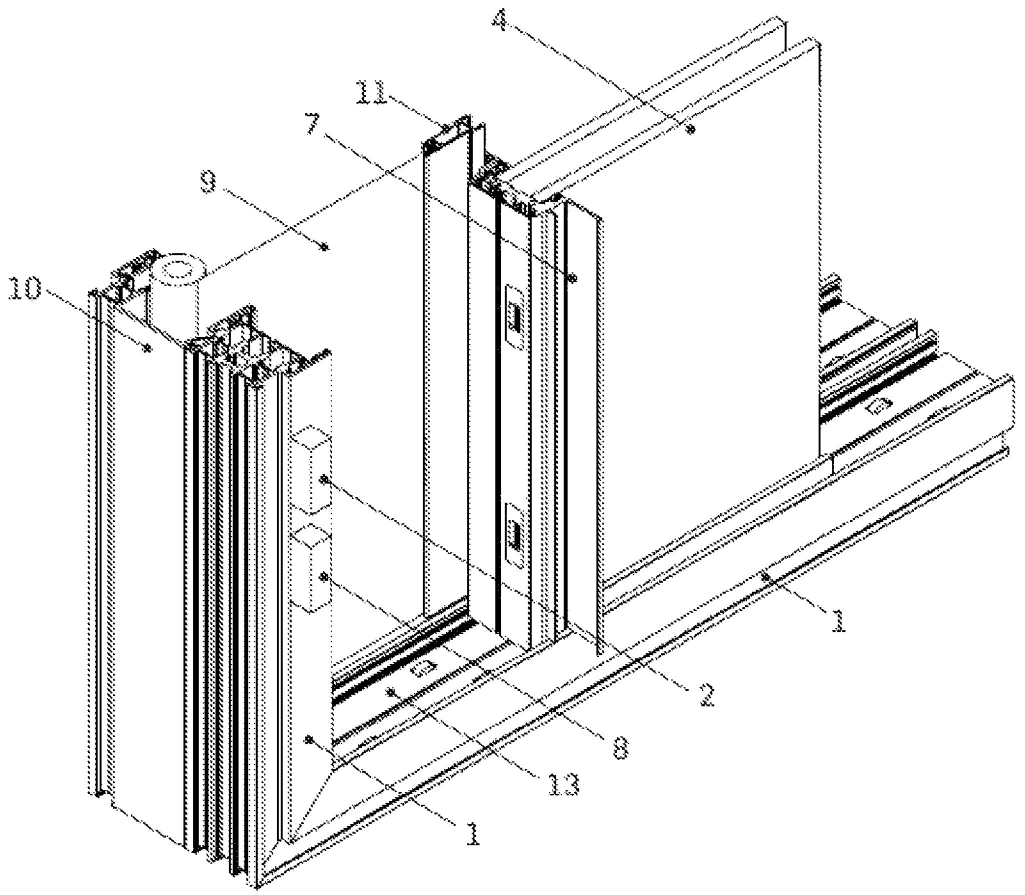

FIG. 11—A three-dimensional horizontal cross-sectional representation of the present invention, wherein the technical characteristics that enable the net (9) to fit into the handle (7) are illustrated.

Figure 12:
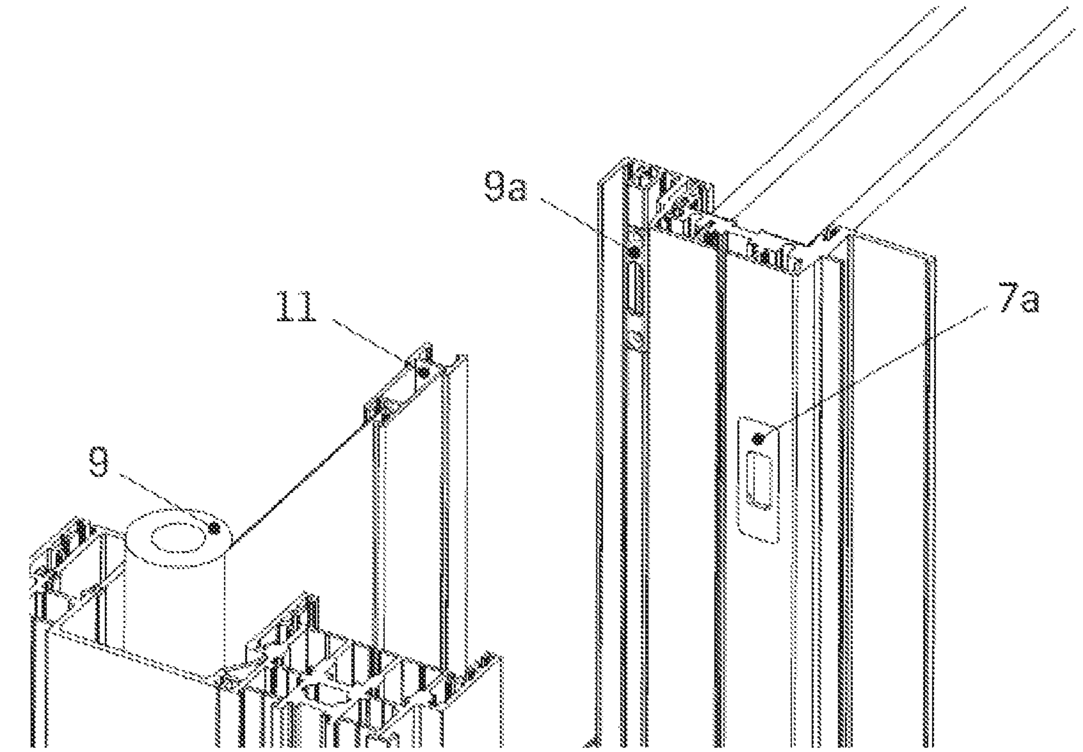

FIG. 12—Detailed representation of the striking plates (7*a*) (9*a*) identified in FIG. 11.

Figure 13:
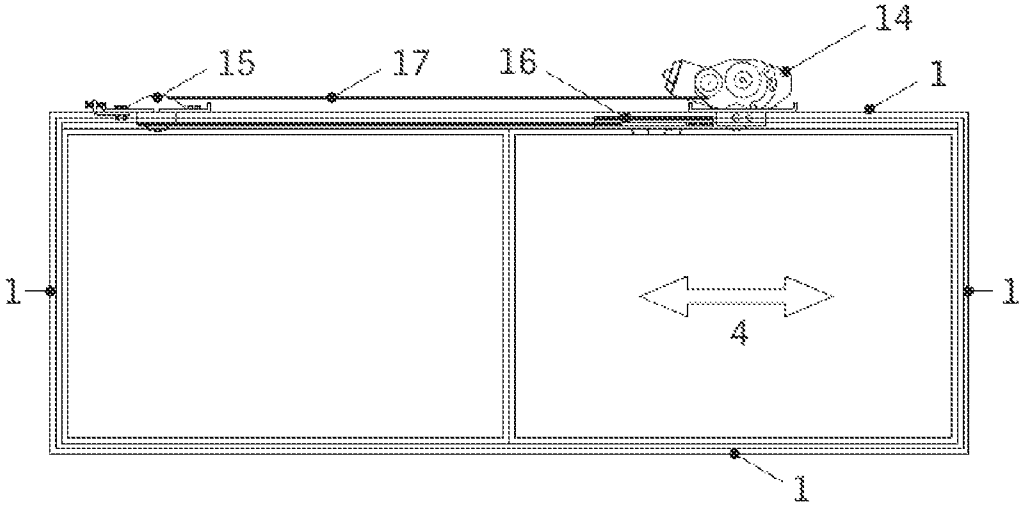

FIG. 13—Raised view of a sash with the actuation system installed on the upper section of the fixed frame (1).

Figure 14:
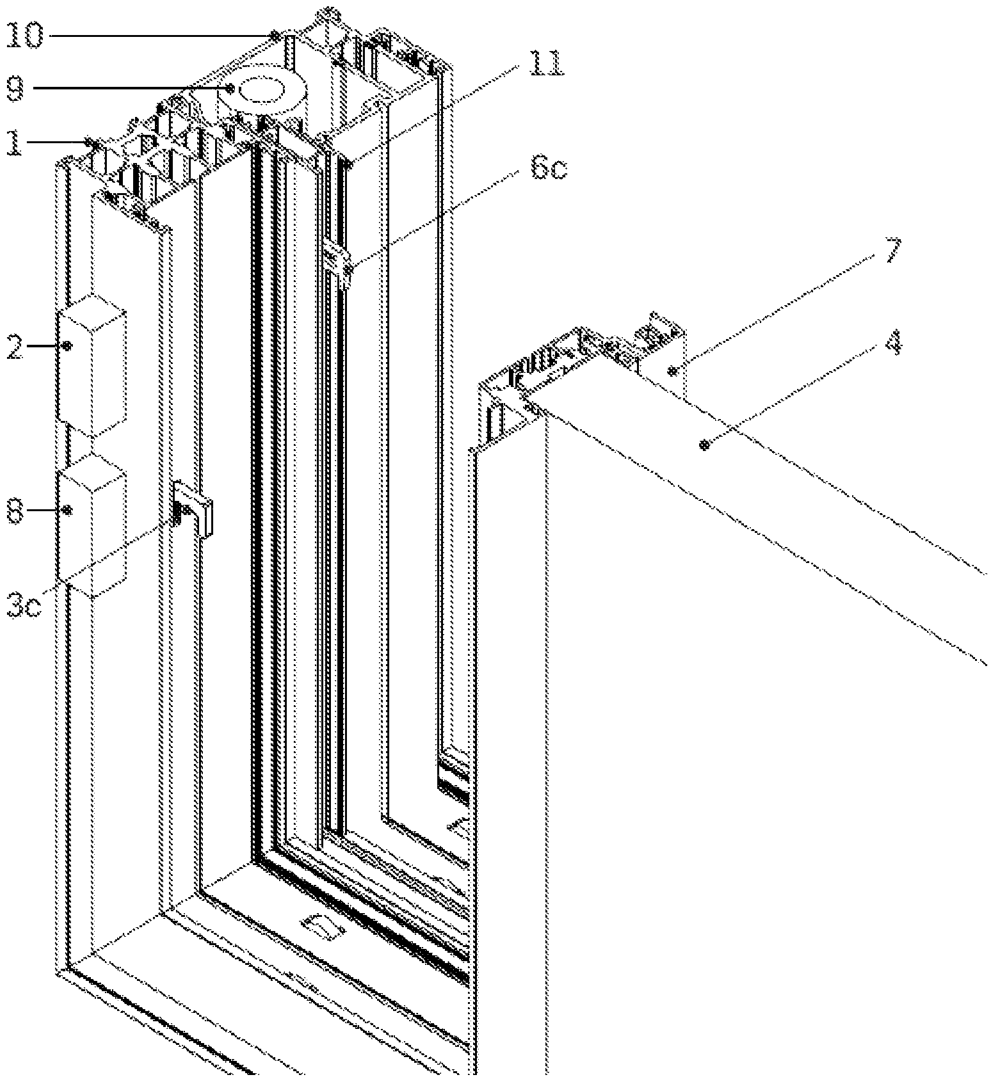

FIG. 14—Perspective view of the sash where the closing points (3*c*) (6*c*) and the respective locking systems (2) and (8) are illustrated.

Figure 15:
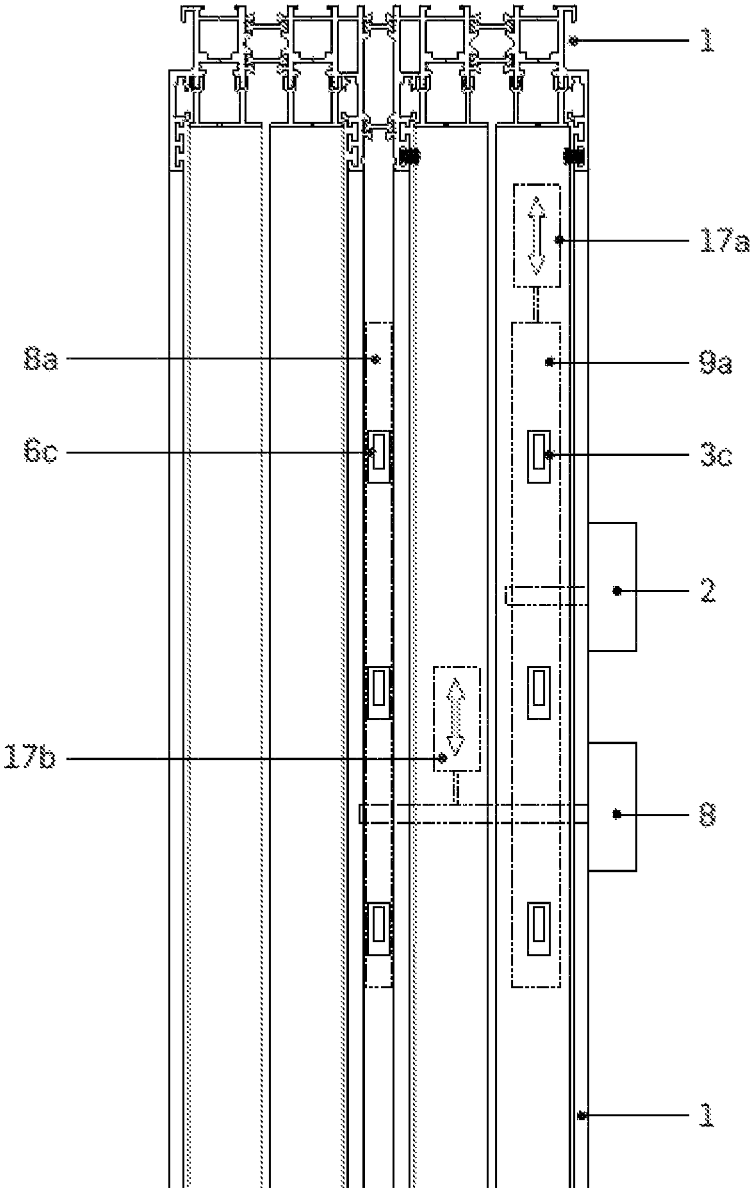

FIG. 15—Front view of the fixed frame (1), showing the locking system (8) of the mosquito net (9), the locking system (2) of the movable panel (4), the rods (8*a*) (2*a*), the solenoid (17*a*) which automatically actuates the locking system (2) of the movable panel (4), the solenoid (17*b*) which automatically actuates the locking system (8) of the mosquito net (9).

DETAILED DESCRIPTION OF THE INVENTION

This invention relates to an aluminium framework for the manufacture of doors or windows, intended for application in a door or window opening of a building, which comprises an anti-pollen and/or mosquito net (9), which, by means of a locking system (8), attaches to a handle (7), allowing the net (9) to move at the same time as the movable panel (4) whenever the movable panel (4) is opened, thus preventing the access to the interior of insects or dust.

So, and as mentioned above, the entrance of insects and/or pollen into the building is fully prevented, since when opening the "window", more specifically, when sliding the leaf for opening, one is simultaneously preventing, through the net, the access to its interior of insects and small particles like pollen. At the same time, the air is allowed to flow into the building, since it passes through the net, thus renewing the air.

In short, the net (9) is housed in the housing profile (10) of the fixed frame (1), a.k.a. window frame, which is rolled up and has at the outer end a panel profile (11), the latter having a rod (8*a*) inside, which by means of fastening means fits into a handle (7). Note that the net (9) is placed only on one side of the fixed frame (1) irrespectively of the number of panels (4) that the window may have.

This handle (7) is located on the panel (4) at one of its sides which engages the side of the fixed frame comprising the net (9), with the other side or the other panel (4), in case the window has more than one panel (4), having only one other handle (3).

Thus, it is through the panel profile (11) and the handle (7) that the net (9) is attached to the panel (4), since the panel profile (11) has a rod (8*a*) therein, which comprises at least one closing point (6*c*) between the adjusting screws (6*a*) which are fixed to the striking plate (9*a*) of the handle (7) by suitable means such as snap-fit or tongue and groove fitting, or any other appropriate means. The closing points (6*c*) have compensating springs (6*b*) therein which allow the automatic adjustment of the closing points (6*c*), giving it a floating functionality with depth adjustment to always guarantee that the latter are correctly adjusted. Shortly, the mosquito net (9) housed in a profile (10) of the fixed frame (1) comprises, at its outer end, a panel profile (11) that can be coupled by fitting of the closing point (6*c*) into the handle (7).

In the same way as mentioned above, the locking system (2) of the panel (4), which is in the fixed frame (1), has a rod (2*a*) therein which, through fastening means, engages a handle (3). It should be noted that concerning the side of the fixed frame (1) which integrates the net (9), the fixed frame (1) simultaneously presents the two locking systems (8) (2) and their constituents.

The fixed frame (1) has a rod (2*a*) therein, which comprises at least one closing point (3*c*) between the adjusting screws (3*a*) which are fixed to the striking plate (7*a*) of the handle (3) by suitable means such as snap-fit or tongue and groove fitting, or any other appropriate means. The closing points (3*c*) have compensating springs (3*b*) therein, which allow for the automatic adjustment of the closing points (3*c*), giving it a floating functionality with depth adjustment to always guarantee that the latter are correctly adjusted.

In short, the handle (7) of the panel (4), which will slide in order to open the window, has a locking system (7) that is integrated in the fixed frame (1) and which allows "gripping" the net (9), if the user so wishes, and when sliding the panel (4), unrolling it to the desired opening, thereby protecting the interior from insects and dust/pollen. If the user does not want the option of the net (9), it will be enough not to actuate the locking system (8).

Therefore, the present invention is essentially comprised of at least one fixed frame (1) and at least one fixed and/or movable panel (4), the latter being inserted into the fixed frame (1) and being movable, either vertically or horizontally, i.e., laterally in parallel or perpendicular planes to the fixed frame (1).

The panel (4) may be moved manually or automatically and may consist of single, double or triple glass panels, or of another type of material. At least one panel (4) comprises a central plumb (6) and/or a reinforcing central plumb (5) at a lateral end, as shown in FIG. 4, which have profiles with 18 mm of visible thickness, and in the other end the movable panel (4) comprises a handle (3). The term plumb refers to a vertical element of the panel. The fixed frame (1) is perimetral and consists of a rigid aluminium frame, usually rectangular or square or triangular in shape. The profiles of the fixed frame (1) are joined together by any means known in the art.

This automatic movement of the panel (4) and/or the net (9) is promoted by an electric motor inserted in the motor support (14) and the free pulley (15) which moves a toothed belt (17) that is fitted into the traction car (16). In order for this movement to be performed automatically, a track for holding and guiding a traction car (16) has been arranged in the fixed frame (1) profile which engages the panel (4).

This movement can simultaneously guide the net (9) with the opening and closing of the panels (4), the traction car (16) being responsible for closing the toothed belt passing the motor support (14) and the free pulley (15). In the fixed frame (1) profile, machining is performed for the insertion of the motor support (14) and the free pulley (15).

This automatic system is also characterized in that it is possible to move the movable panels (4) and to actuate the locking system (2), even in case of unavailable electric power, since the electric motor is reversible, meaning that the motor can be rotated manually in the event of an electric power failure. Therefore, it is possible to move the movable panel (4) so as to close and/or open the window even without electricity, hence the locking systems are also automatic and manual.

The present invention comprises in the heights, that is to say, on the sides next to the wall or to the upper or lower edges—lintel on top, sill in the bottom—if the movement is vertical, of the fixed frame (1) a net (9). The said net (9) is inserted into a winder, which is wound or unwound automatically by torsion springs inserted inside the net's (9) winder.

The present invention also enables the manufacture and use of panels (4) weighing up to 2000 kg per linear meter. The profiles forming the fixed frame (1) and the parts constituting the fastening system (7) have been developed in order to cause the movement of the panels (4) to be automated without the need to add more profiles to the system.

So as to move the panels (4) with minimum effort, an aluminium profile in which bearings are mounted was specially designed for this system, which is called a slide rule (13). The latter is housed in the lower part of the fixed frame (1) into specially designed grooves intended for securing the slide rules (13). The number of bearings used in each slide rule (13) depends on the weight and width of the panels (4) and the bearings used are from stainless steel.

The locking system (2) of the movable panels (4) is integrated into the aluminium profiles of the fixed frame (1) and allows adjusting the number of closing points to the size of the movable panels, the closing points are floating and susceptible of being adjusted in depth in order to always ensure a correct adjustment of the closing point with the striking plate of the handle (3), which is a characteristic distinct from the one of the current state of the art. Also as mentioned above, the closing points (6*c*) are floating and adjusted in depth so as to always ensure a correct adjustment of the closing point with the striking plates of the fixing system (7) of the mosquito net (9).

A brass bar (12) is also used which is attached to the lower portion of the panel (4). The brass bar (12) is in direct contact with the bearings of the slide rule (13) and is aimed at preventing wear of the aluminium profiles which form the panels (4), as well as at allowing a smooth sliding thereof.

As will be evident to the person skilled in the art, this invention should not be limited to the embodiments described herein, and a number of changes are possible which remain within the scope of the present invention. Obviously, the preferred embodiments described above are combinable in the different possible forms, the repetition of all such combinations being thus herein avoided.

The invention claimed is:

1. An aluminium framework for the manufacture of doors or windows, for application in a door or window opening of a building wherein said framework comprises:

a fixed frame (1) including a first track and a second track, parallel and adjacent to said first track;

at least one movable panel (4) inserted into said fixed frame (1) on said first track;

at least one mosquito net (9) housed in a profile (10) on said second track, said profile integrated in said fixed frame (1);

wherein the movable panel (4) comprises a first handle (7) at one of its sides, the first handle engaging a side of the fixed frame (1) comprising the mosquito net (9), wherein the mosquito net (9) comprises a winder which is automatically wound and unwound by means of torsion springs inserted in the winder and a panel profile (11) at an outer end of the mosquito net (9), said panel profile (11) disposed on, and movable along, said second track;

a first locking system (2) for locking the movable panel (4), integrated in the fixed frame (1), with at least one closing point (3*c*), and comprising a first solenoid (17*a*) for either manually or remotely actuating the first locking system (2), for engaging the first handle (7);

a second locking system (8) for locking the mosquito net (9) to the first handle (7) of the movable panel (4), integrated in the panel profile (11) of the mosquito net (9), with at least one further closing point (6*c*), and comprising a second solenoid (17*b*) for either manually or remotely actuating the second locking system (8), for engaging the first handle (7);

wherein said panel profile (11) is coupled by fitting of the further closing point (6*c*) into the first handle (7).

2. The framework according to the claim 1, wherein the at least one panel (4) comprises a central plumb (6) and/or a reinforcing central plumb (5) at a lateral end, and a second handle (3) at another end.

3. The framework according to the claim 1, wherein the at least one panel (4) is vertically or horizontally movable, laterally in parallel or perpendicular planes to the fixed frame (1).

4. The framework according to claim 1, wherein the at least one panel (4) is manually or automatically moveable and it is comprised of single, double or triple glass panels.

5. The framework according to claim 1, wherein the at least one panel (4) weighs up to 2000 kg per linear meter.

6. The framework according to claim 2, wherein the central plumb (6) and/or reinforcing central plumb (5) have profiles with 18 mm of visible thickness.

7. The framework according to claim 1, wherein the fixed frame (1) is perimetral and comprised of a rigid aluminium frame which is rectangular or square or triangular in shape, and the fixed frame (1) comprises profiles joined together.

8. The framework according to claim 1, wherein the framework further comprises:

an electric motor;
a motor support (14);
a toothed belt (17);
a free pulley (15);
a traction car (16);
a third track for holding and guiding the traction car (16); wherein
the third track is arranged in the profile of the fixed frame (1), said profile engaging the at least one movable panel (4);
the electric motor is inserted in the motor support (14) and promotes automatic movement of the at least one movable panel (4); the toothed belt (17) is fitted into the traction car (16), the traction car engaging the at least one movable panel (4) and guiding the movement of the mosquito net (9) along with the opening and closing of the at least one movable panel (4).

9. The framework according to claim 8, wherein the electric motor is reversible.

10. The framework according to claim 1, wherein the framework further comprises:

a) at least one slide rule (13) housed in a lower portion of the fixed frame (1), wherein the at least one slide rule is an aluminum profile in which bearings are mounted, and fixed into grooves; and
b) at least one brass bar (12) attached to a lower section of the panel (4) contacting directly with the slide rule (13) bearings.

11. The framework according to claim 10, wherein the bearings are made from stainless steel.

12. The framework according to claim 1, wherein both closing points (3*c*)(6*c*) are floating and adjustable in depth.

13. The framework according to claim 8, wherein the framework further comprises:

a. at least one slide rule (13) housed in a lower portion of the fixed frame (1), wherein the at least one slide rule is an aluminum profile in which bearings are mounted, and fixed into grooves; and
b. at least one brass bar (12) attached to a lower section of the panel (4) contacting directly with the slide rule (13) bearings.

14. The framework according to claim 13, wherein the bearings are made from stainless steel.

* * * * *